(12) United States Patent  (10) Patent No.: US 7,909,345 B1
Olson                      (45) Date of Patent:     Mar. 22, 2011

(54) TRIPLE TREE SYSTEM FOR MOUNTING MOTORCYCLE HANDLEBARS

(75) Inventor: Quentin James Olson, Hixton, WI (US)

(73) Assignee: Quentin James Olson, Hixton, WI (US)

( * ) Notice: Subject to any disclaimer, the term of this patent is extended or adjusted under 35 U.S.C. 154(b) by 192 days.

(21) Appl. No.: 12/386,452

(22) Filed: Apr. 20, 2009

Related U.S. Application Data

(60) Provisional application No. 61/208,524, filed on Feb. 25, 2009.

(51) Int. Cl.
    *B62K 21/02* (2006.01)
(52) U.S. Cl. .................. 280/279; 280/276; 280/280
(58) Field of Classification Search .............. 280/276, 280/279, 280; 74/551.1, 551.2
    See application file for complete search history.

(56) References Cited

U.S. PATENT DOCUMENTS

| | | | |
|---|---|---|---|
| 5,967,538 A * | 10/1999 | Callaluca et al. | 280/279 |
| 6,837,508 B2 | 1/2005 | Francis et al. | |
| 7,121,568 B2 | 10/2006 | Law | |
| D544,818 S | 6/2007 | Costa | |
| 7,357,403 B2 | 4/2008 | Vincenzo | |
| 7,360,963 B1 | 4/2008 | Burns | |
| 7,441,622 B2 | 10/2008 | Costa | |

* cited by examiner

*Primary Examiner* — Joanne Silbermann
*Assistant Examiner* — Marc A Scharich

(57) ABSTRACT

A triple tree system for mounting the front fork of a motorcycle to the handlebars and to the frame thereof. The system includes upper and lower triple tree members. The upper triple tree member includes a pair of apertures, each containing a threaded connector member fastened at one end to an internally threaded end of one handlebar member, and fastened at an opposite end to an internally threaded end of one fork tube. The lower triple tree member includes a pair of apertures, each accepting one of the fork tubes there through. Threaded apertures, each of which intersect an aperture holding a fork tube, contain a set screw that advances a rod into the fork tube aperture, thereby contacting one of the fork tubes therein, to lock the fork tubes to the lower triple tree member. A stem member is attached between the upper and lower triple tree members and attached to the frame of the motorcycle.

20 Claims, 9 Drawing Sheets

TRIPLE TREE SYSTEM FOR MOUNTING MOTORCYCLE HANDLEBARS

CROSS-REFERENCE TO RELATED APPLICATIONS, IF ANY

This application claims the benefit under 35 U.S.C. §119(e) of co-pending provisional application Ser. No. 61/208,524, filed Feb. 25, 2009. Application Ser. No. 61/208,524 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to motorcycles and, more particularly, to a system for mounting motorcycle handlebars and, most particularly, to a unique triple tree system for mounting motorcycle handlebars.

2. Background Information

Motorcycles are controlled by the rider grasping the handlebars of the motorcycle and making adjustments to the front wheel to steer the motorcycle. The handlebars need to be responsive to the movements of the rider, but not over reactive to these movements.

An example of handlebars conventionally mounted to a motorcycle, in accordance with the prior art, is illustrated in FIG. 1. The prior art handlebars 11 are mounted to the parallel front fork tubes 12 of a motorcycle through an upper triple tree 13 and a lower triple tree 14. The handlebars 11 include a single length of tubing attached to the upper triple tree 13 and supported by a pair of symmetrically spaced struts 15 bolted to the upper triple tree 13 and attached to the handlebar 11. The upper triple tree 13 is attached to the lower triple tree 14 by means of a stem 16, which lies along the axis of rotation of the front fork tubes 12. The handlebar mounting arrangement in prior art motorcycles, such as shown in FIG. 1, interrupts the smooth flow of a line between the fork tubes 12 and the handlebars 11. The offset of the struts 15 from the line of the fork tubes 12 is aesthetically displeasing and aerodynamically and mechanically inefficient due to turbulent air flow and the relatively small moment arm of the closely spaced struts 15. It is, therefore, desirable to provide a motorcycle handlebar mounting system that provides continuity between the line of flow of the handlebars 11 and the front fork tubes 12.

Applicant has devised a triple tree system for mounting motorcycle handlebars that is unique and provides a distinct improvement over currently available handlebar mounting devices.

SUMMARY OF THE INVENTION

The invention is a triple tree system for mounting the front fork tubes of a motorcycle to the handlebars, and for mounting the front fork tubes of the motorcycle to the frame thereof. The triple tree system comprises an upper triple tree member and a lower triple tree positioned in register. The upper triple tree member has a top side and a bottom side, and includes a pair of apertures each having a threaded connector member rotatably mounted therein. Each threaded connector member is secured at a first end to a connection end of one handlebar member. The connector end of each handlebar member contacts the top side of the upper triple tree member when fastened to the connector member. Each threaded connector is adapted for securing at a second end to a free upper end of one front fork tube of the motorcycle. The upper end of the front fork tubes contacts the bottom side of the upper triple tree member when fastened to the connector member.

The lower triple tree member includes a pair of fork tube apertures. Each aperture is adapted for accepting one of the front fork tubes of the motorcycle there through. The lower triple tree member includes a pair of internally threaded apertures, with each threaded aperture intersecting an exterior surface of the lower triple tree member and one fork aperture adapted for holding a front fork tube. A set screw member is positioned within each internally threaded aperture for advancing a rod into one fork tube aperture, thereby contacting one of the front fork tubes therein, and locking the front fork tubes to the lower triple tree member. A stem member is attached between the upper and lower triple tree members. The stem member is adapted for attachment to the frame of the motorcycle.

DESCRIPTION OF THE EMBODIMENTS

Nomenclature

Figure 1:
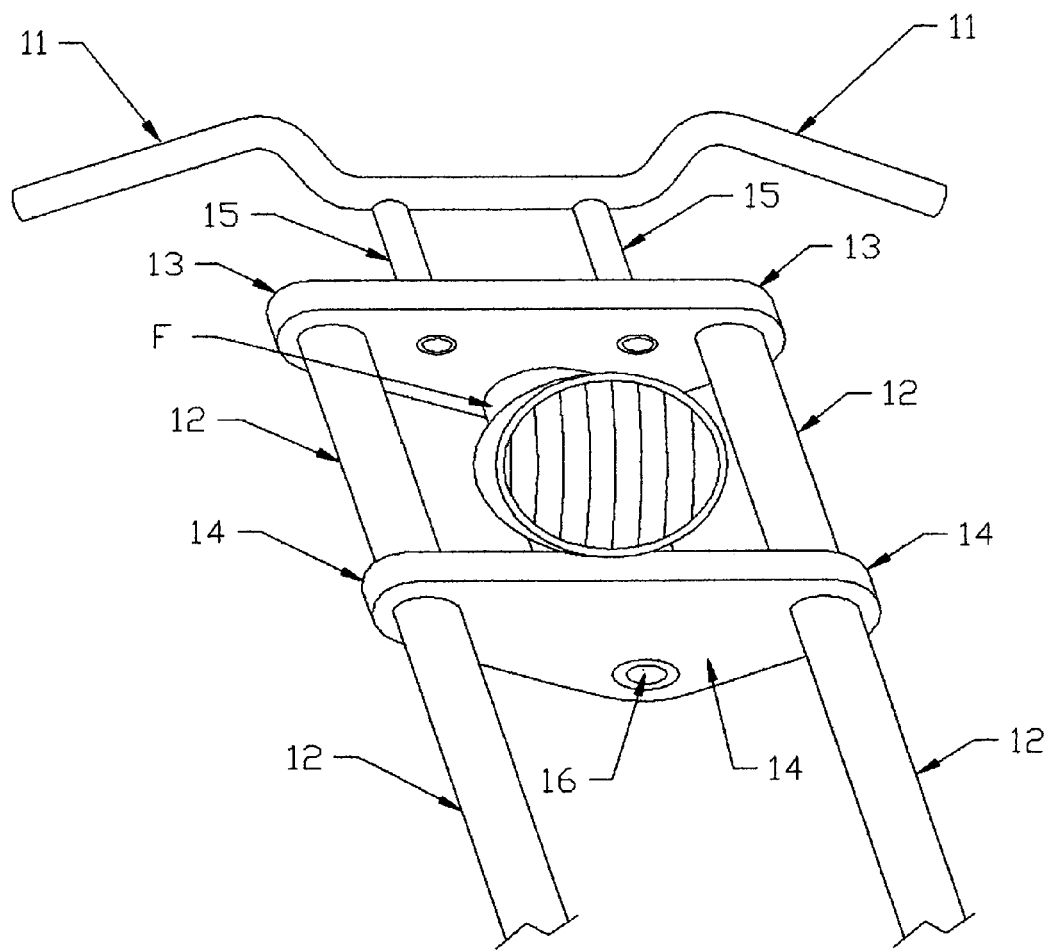
FIG. 1 is a perspective view of conventional handlebars mounted to conventional triple trees of a motorcycle in accordance with the prior art.

11 Handlebars
12 Front Fork Tubes of Motorcycle
13 Upper Triple Tree

14 Lower Triple Tree
15 Struts
16 Stem Member
17 Threaded First End of Stem Member
18 Threaded Second End of Stem Member
19 Threaded Mounting Plug Member
20 Threaded Upper End of Front Fork Tubes
25 Steering Head Bearings
27 Top Surface of Upper Triple Tree Member
28 Bottom Surface of Upper Triple Tree Member
30 Triple Tree System
31 First Handlebar Member of System
31a Threaded End of First Handlebar Member
32 Second Handlebar Member of System
32a Threaded End of Second Handlebar Member
33 Upper Triple Tree Member
34 Lower Triple Tree Member
35 Connector Apertures in Upper Triple Tree Member
36 Stem Aperture in Upper Triple Tree Member
37 Front Fork Apertures in Lower Triple Tree Member
38 Stem Aperture in Lower Triple Tree Member
40 Threaded Connector Member
42 Threaded First End of Connector Member
44 Threaded Second End of Connector Member
45 End Feature of Connector Member
46 Locking Pin Members
48 Pin Apertures in Threaded End of Handlebar Members
50 Pin Apertures in Triple Tree Members
52 Threaded Apertures of Lower Triple Tree Member
54 Set Screws within Threaded Apertures
56 Threaded Passageway of Lower Triple Tree Member
58 Set Screw within Passageway
59 Head Light Mounting block Screw
60 Shoulder Area of Aperture
62 Shoulder Area of Aperture
65 Access Aperture of Lower Triple Tree Member
70 Brass Rod in Aperture
75 Light Mounting Block
80 Filler Piece for Access Aperture
F Frame of Motorcycle
Construction The invention is a triple tree system for mounting the front fork of a motorcycle to the handlebars, and for mounting the front fork of a motorcycle to the frame thereof. The triple tree system comprises an upper triple tree member and a lower triple tree positioned in register. The upper triple tree member has a top side and a bottom side, and includes a pair of apertures each having a threaded connector member rotatably mounted therein. Each threaded connector member is secured at a first end to a connection end of one handlebar member. The connector end of each handlebar member contacts the top side of the upper triple tree member. Each threaded connector is adapted for securing at a second end to a free upper end of one front fork tube of the motorcycle. The upper end of the front fork tubes contacts the bottom side of the upper triple tree member when fastened to the connector member.

The lower triple tree member includes a pair of fork tube apertures. Each aperture is adapted for accepting one of the front fork tubes of the motorcycle there through. The lower triple tree member includes a pair of internally threaded apertures, with each threaded aperture intersecting an exterior surface of the lower triple tree member and one fork aperture adapted for holding a front fork tube. A set screw member is positioned within each internally threaded aperture for advancing a brass rod into one fork tube aperture, thereby contacting one of the front fork tubes therein, and locking the front fork tubes to the lower triple tree member. A stem member is attached between the upper and lower triple tree members. The stem member is adapted for attachment to the frame of the motorcycle.

Figure 2:
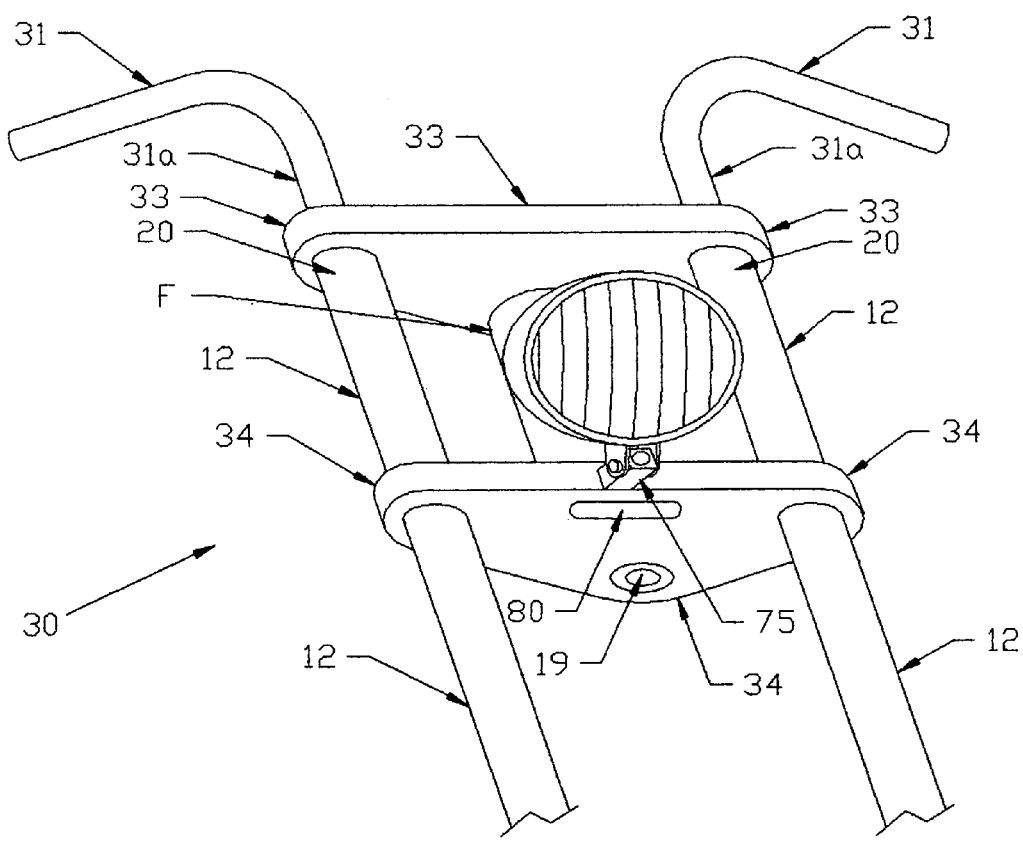
FIG. 2 is a perspective view of handlebars mounted to the front fork tubes of a motorcycle by the triple tree system of the present invention.
Figure 5:
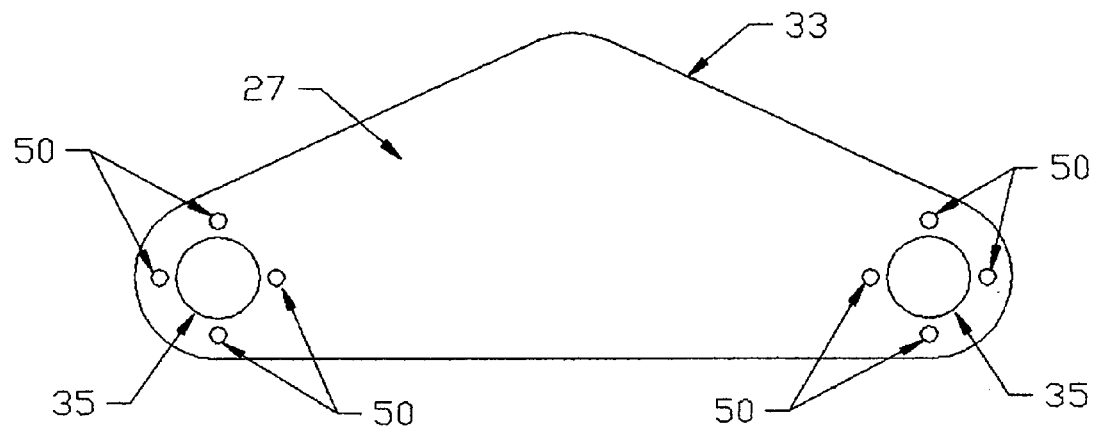
FIG. 5 is a top view of the upper triple tree member of the triple tree system of the present invention.
Figure 6:
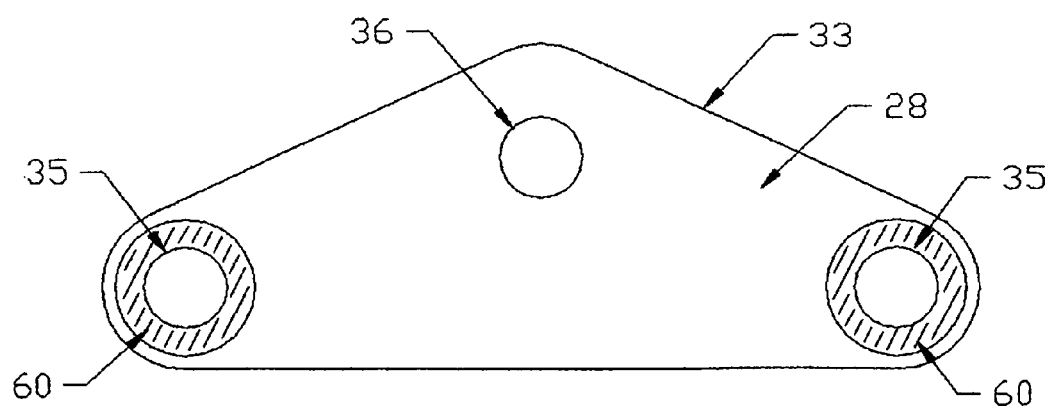
FIG. 6 is bottom view of the upper triple tree member of the triple tree system of the present invention.
Figure 7:
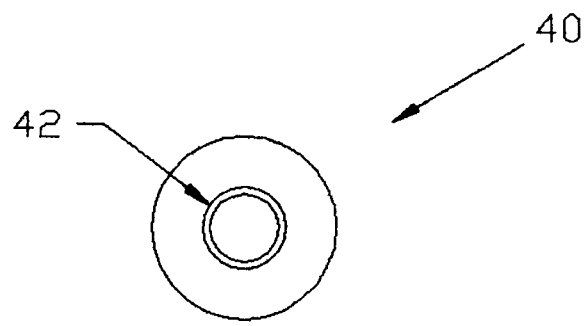
FIG. 7 is a top view of one of the threaded connector members of the triple tree system of the present invention.
Figure 8:
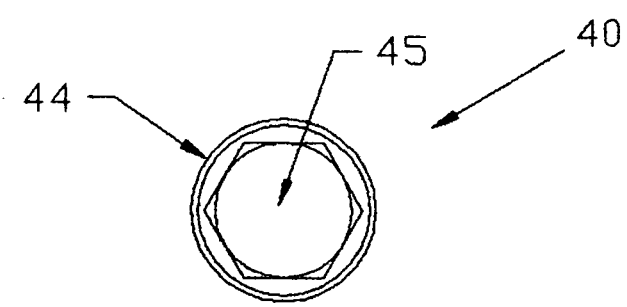
FIG. 8 is a bottom view of one of the threaded connector members of the triple tree system of the present invention.

Referring now to the FIG. 2, the invention is a triple tree system 30 for mounting the front fork tubes 12 of a motorcycle to the handlebars 31 and for mounting the front fork tubes 12 of a motorcycle to the frame F thereof. The triple tree system 30 comprises an upper triple tree member 33 and a lower triple tree member 34, positioned in register. As shown in FIGS. 5 and 6, the planar, upper triple tree member 33 is triangular in shape and includes a pair of connector apertures 35 that each accepts a threaded connector member 40 therein, with the threaded connector ends 42, 44 extending from each connector aperture 35 on each side of the upper triple tree member 33. The connector apertures 35 each contain a shoulder area 60 that limits upward movement of the threaded connector member 40 therein, as shown in FIG. 6. The threaded first end 42 of each connector member 40 extends from the top side 27 of the upper triple tree member 33 and contains external threads that are connected to an internally threaded end 31a of one handlebar member 31. At least one locking pin member 46 protrudes from the top side 27 of the upper triple tree member 33 adjacent each connector aperture 35 and mates with at least one aperture in the threaded end 31a of the handlebar member 31 that is attached to the threaded end 42 of each connector member 40. A plurality of locking pin members 46 is positioned within a like plurality of apertures 50 surrounding the connector apertures 35 in the upper triple tree member 33. The locking pin members 46 lock the handlebar members 31 in a selected orientation relative to the upper triple tree member 33. The connector member 40 includes a feature 45 at the second end 44 thereof, adapted for receiving a tool to rotate the threaded connector member 40, thereby drawing the threaded first end 42 into the threaded end 31a of the handlebar member 31.

Figure 3:
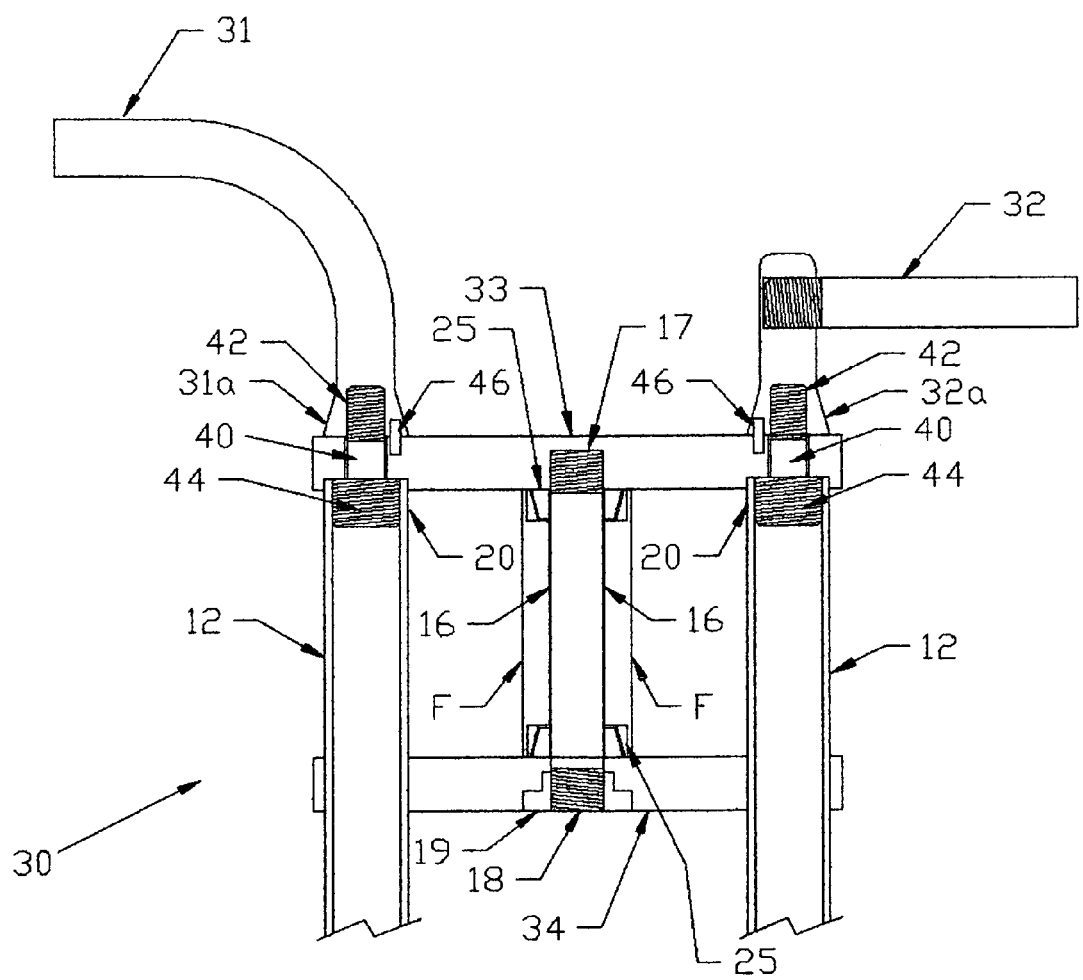
FIG. 3 is a front, transparent view of the triple tree system of the present invention employing two variations of handlebars for a motorcycle.
Figure 4:
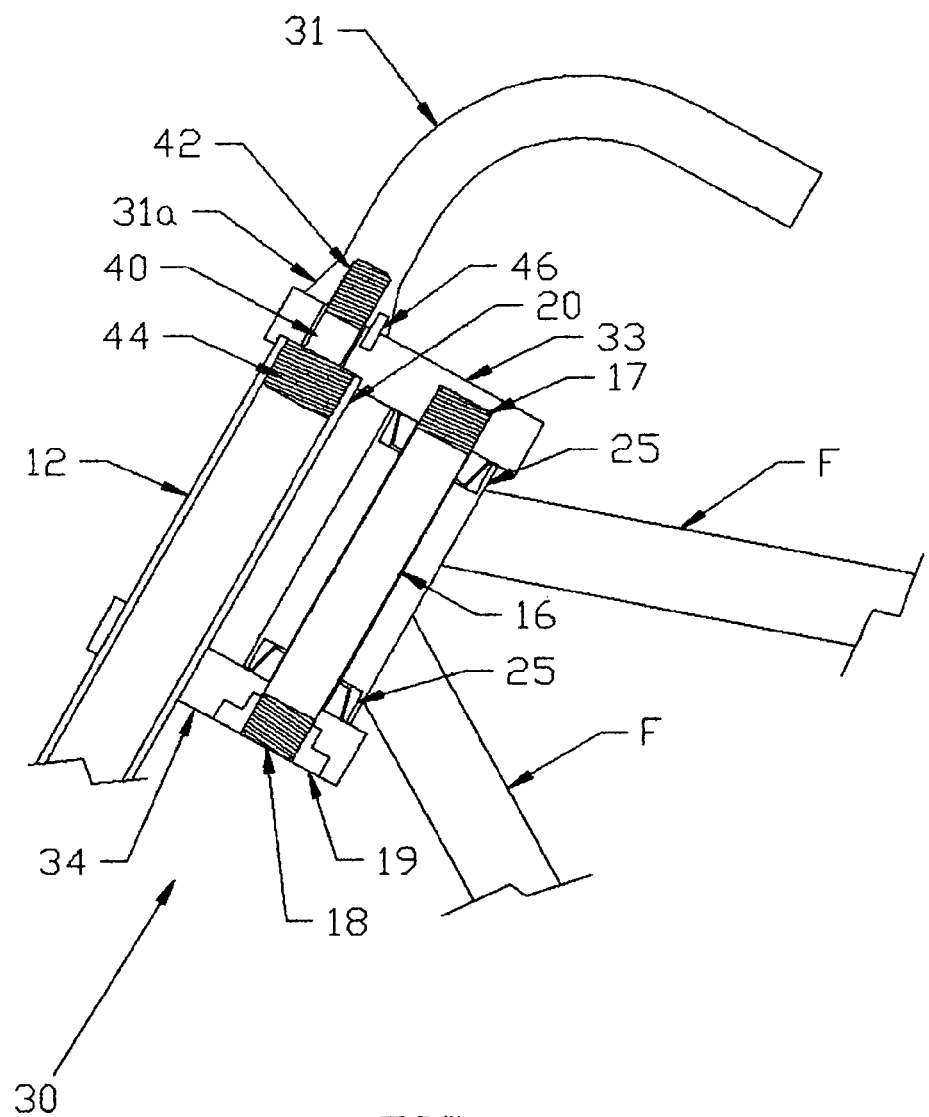
FIG. 4 is a side, transparent view of the triple tree system of the present invention secured to the frame of a motorcycle.

The threaded second end 44 of each connector member 40 extending from the bottom side 28 of the upper triple tree member 33 also contains external threads that are connected to an internally threaded end 20 of one of the front fork tubes 12 of the motorcycle that holds the front wheel thereof. Thus, each handlebar member 31 is rigidly connected to one of the front fork tubes 12 of the motorcycle via a threaded connector member 40. Semi-transparent views of the triple tree system 30 are shown in FIGS. 3 and 4. An alternative structure for a handlebar 32 with a threaded end 32a is illustrated in FIG. 3.

Figure 9:
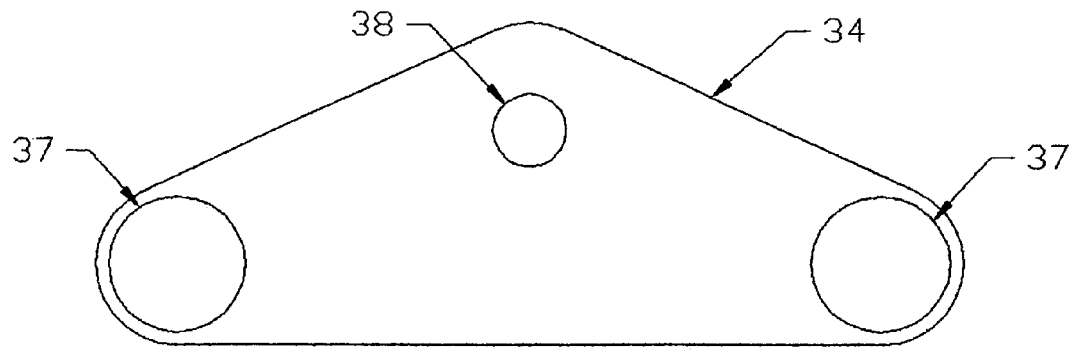
FIG. 9 is a top view of the lower triple tree member of the triple tree system of the present invention.
Figure 10:
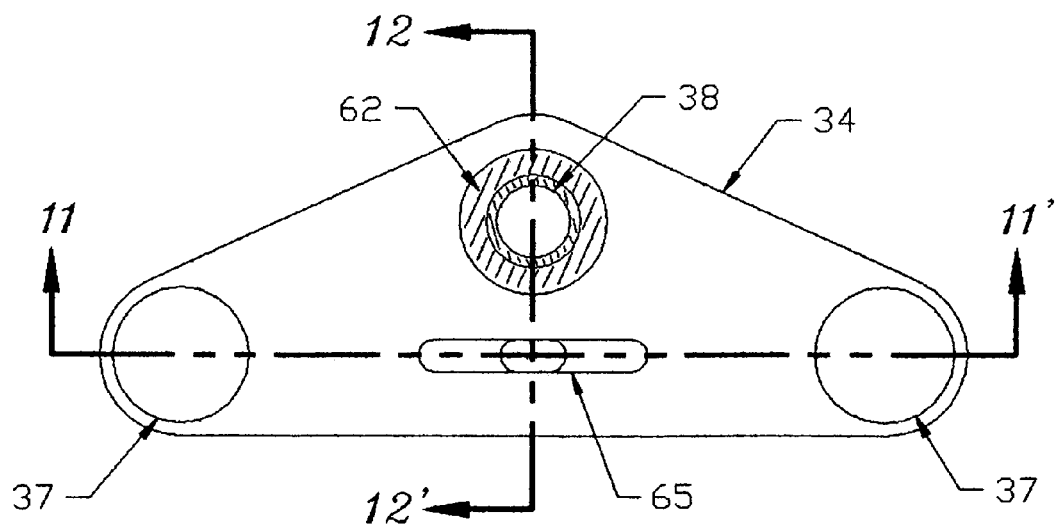
FIG. 10 is a bottom view of the lower triple tree member of the triple tree system of the present invention.
Figure 11:
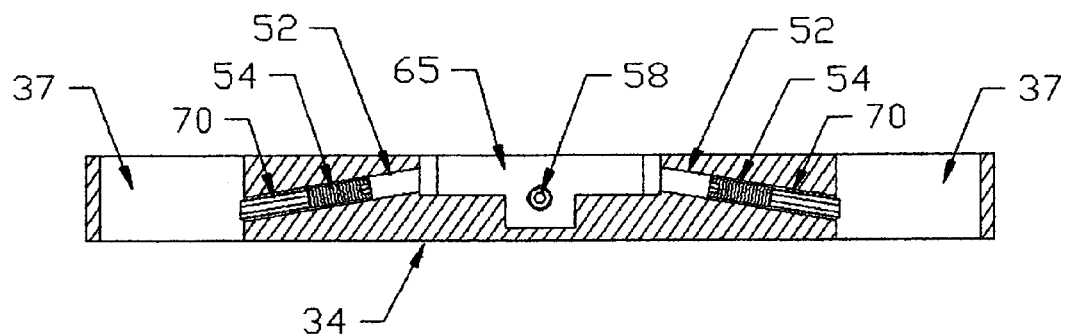
FIG. 11 is a sectional view of the lower triple tree member along line 11-11' of FIG. 10 of the triple tree system of the present invention.
Figure 12:
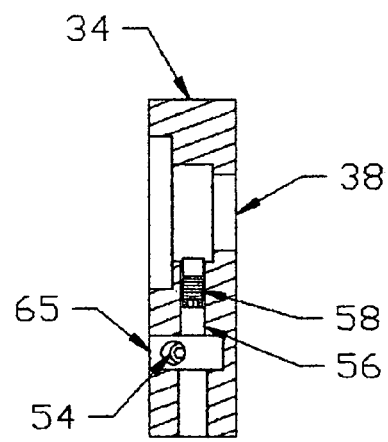
FIG. 12 is a sectional view of the lower triple tree member along line 12-12' of FIG. 10 of the triple tree system of the present invention.
Figure 13:
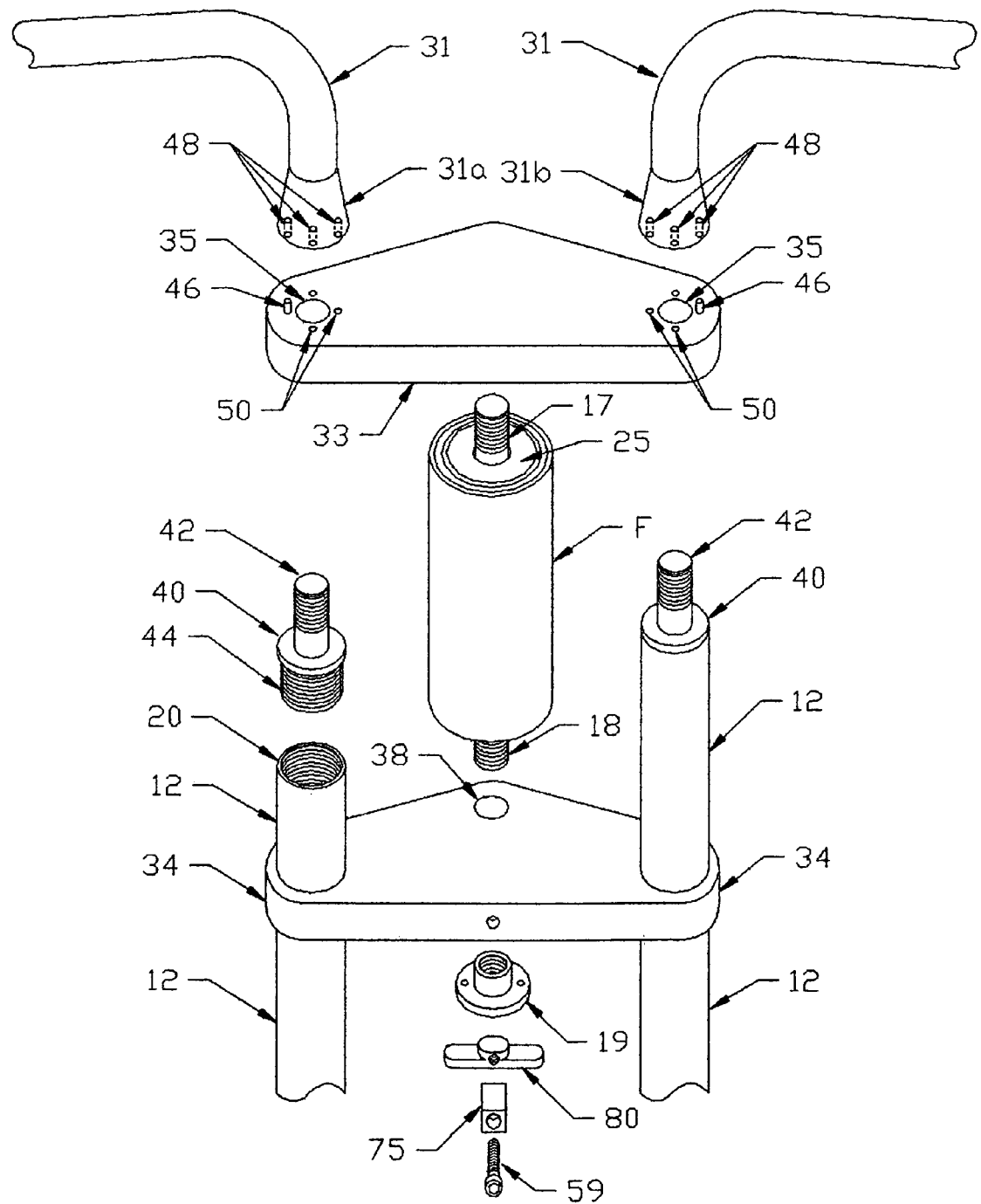
FIG. 13 is an exploded view of the components of the triple tree system of the present invention.

Referring now to FIGS. 9 and 10, the planar, lower triple tree member 34 is also triangular in shape and includes a pair of fork tube apertures 37 that each accepts one of the front fork tubes 12 of the motorcycle there through. The lower triple tree member 34 also includes threaded apertures 52, each of which intersect one of the fork tube apertures 37 holding each of the front fork tubes 12, and an exterior surface of the lower triple tree member 34. A set screw member 54 is positioned within each threaded aperture 52 and advancement of the set screw member 54 within the aperture 37 contacts one of the front fork tubes 12 therein, to lock the front fork tubes 12 to the lower triple tree member 34. The threaded apertures 52 and set screw members 54 are best seen in FIGS. 11 and 12. Preferably, a brass rod 70 is interposed between each set screw member 54 and the contact point on the front fork tube 12 within each tube aperture 37. The access aperture 65 in the surface of the lower triple tree member 34 provides access to rotate the set screw members 54 with an appropriate tool. A filler piece 80 plugs the access aperture 65 when not in use. As shown in FIG. 11, the internally threaded apertures 52 of the lower triple tree member 34 intersect each fork tube aperture 37 at a non-perpendicular angle. Consequently, the set screw member 54, or the interposed brass rod 70, contacts the fork tube 12 within the aperture 37 at a non-perpendicular angle.

In addition, the upper and lower triple tree members 33, 34 are connected with a stem member 16 that provides attachment of the triple tree system 30 to the frame F of the motorcycle. The stem member 16 includes threaded ends 17, 18 that connect to each triple tree member 33, 34. The bottom side 28 of the upper triple tree member 33 includes an internally threaded cavity 36 that accepts the externally threaded end 17 of the stem member 16. The lower triple tree member 34 includes a third aperture 38 that contains a mounting plug member 19 that connects to the opposite end 18 of the stem member 16. The mounting plug member 19 is maintained within the lower triple tree member 34 by another set screw member 58 mounted in a threaded passageway 56 that intersects the third aperture 52 and an exterior surface of the lower triple tree member 34. Advancement of the set screw member 58 into the third aperture 52 contacts the mounting plug member 19 and thereby maintains the connected stem member 16 in position. The stem member 16 also includes steering head bearings 25 that facilitate pivoting of the triple tree system 30 relative to the frame F of the motorcycle. Additionally, a light mounting block 75 is secured to the lower triple tree member 34 with a mounting block screw 59 for attaching a head light to the motorcycle.

Thus, the triple tree system 30 of the present invention provides collinear attachment of the front fork tubes 12 directly to the handlebars 31 of the motorcycle. The triple tree system 30 also provides an aesthetically pleasing and aerodynamically smooth structure for the front end of the motorcycle.

While the invention has been particularly shown and described with reference to preferred embodiments thereof, it will be understood by those skilled in the art that various changes in form and details may be made therein without departing from the spirit and scope of the invention.

I claim:

1. A triple tree system for a motorcycle having two front fork tubes, each front fork tube having a fixed lower end and a free upper end, the triple tree system adapted for mounting to individual handlebar members and to a frame of the motorcycle, the triple tree system comprising:

an upper triple tree member and a lower triple tree member, the triple tree members positioned in register;

the upper triple tree member having a top side and a bottom side, the upper triple tree member including a pair of apertures each having a threaded connector member rotatably mounted therein, a first end of each threaded connector member adapted for securing to a connection end of one handlebar member, a second end of each threaded connector member adapted for securing to a free upper end of one front fork tube of the motorcycle;

the lower triple tree member including a pair of fork tube apertures, each fork tube aperture adapted for receiving one of the front fork tubes of the motorcycle there through, a pair of internally threaded apertures, each internally threaded aperture intersecting an exterior surface of the lower triple tree member and one fork tube aperture adapted for holding a front fork tube, a set screw member within each internally threaded aperture for advancing a rod into one fork tube aperture, thereby contacting one of the front fork tubes therein, and locking the front fork tubes to the lower triple tree member; and a stem member attached between the upper and lower triple tree members, the stem member adapted for attachment to the frame of the motorcycle.

2. The triple tree system for a motorcycle having two front fork tubes of claim 1, wherein the apertures in the upper triple tree member each include a shoulder area limiting movement of the threaded connector member toward the top side of the upper triple tree member.

3. The triple tree system for a motorcycle having two front fork tubes of claim 1, wherein each threaded connector member is externally threaded at both first and second ends, and each connection end of the handlebar members and each free end of the front fork tubes are internally threaded.

4. The triple tree system for a motorcycle having two front fork tubes of claim 2, further including at least one locking pin member protruding from the top side of the upper triple tree member adjacent each aperture therein, the at least one locking pin member insertable into an aperture in the connection end of the handlebar member, thereby locking an orientation of the handlebar member relative to the upper triple tree member.

5. The triple tree system for a motorcycle having two front fork tubes of claim 1, wherein each threaded connector member includes a feature at the second end thereof adapted for receiving a tool to rotate the threaded connector member.

6. The triple tree system for a motorcycle having two front fork tubes of claim 1, wherein the internally threaded apertures of the lower triple tree member intersect each fork tube aperture at a non-perpendicular angle.

7. The triple tree system for a motorcycle having two front fork tubes of claim 1, wherein the stem member includes threaded upper and lower ends, the threaded upper end attached to a threaded cavity in the upper triple tree member, and the threaded lower end attached to a mounting plug member secured in a plug aperture in the lower triple tree member.

8. The triple tree system for a motorcycle having two front fork tubes of claim 7, further including a second set screw member positioned within a threaded aperture intersecting the plug aperture in the lower triple tree member and an external surface of the lower triple tree member, the second set screw member advancing into the plug aperture, thereby contacting the mounting plug member therein.

9. A triple tree system for a motorcycle having two front fork tubes, each front fork tube having a fixed lower end and a free upper end, the triple tree system adapted for mounting to individual handlebar members and to a frame of the motorcycle, the triple tree system comprising:

an upper triple tree member and a lower triple tree member, the triple tree members positioned in register;

the upper triple tree member having a top side and a bottom side, the upper triple tree member including a pair of apertures each having a threaded connector member rotatably mounted therein, each threaded connector member secured at a first end to a connection end of one handlebar member, the connection end of each handlebar member contacting the top side of the upper triple tree member, a second end of each threaded connector member adapted for securing to a free upper end of one front fork tube of the motorcycle;

the lower triple tree member including a pair of fork tube apertures, each fork tube aperture adapted for receiving one of the front fork tubes of the motorcycle there through, a pair of internally threaded apertures, each internally threaded aperture intersecting an exterior surface of the lower triple tree member and one fork tube aperture adapted for holding a front fork tube, a set screw member within each internally threaded aperture for advancing a rod into one fork tube aperture, thereby contacting one of the front fork tubes therein, and locking the front fork tubes to the lower triple tree member; and a stem member attached between the upper and lower triple tree members, the stem member adapted for attachment to the frame of the motorcycle.

10. The triple tree system for a motorcycle having two front fork tubes of claim 9, wherein the apertures in the upper triple tree member each include a shoulder area limiting movement of the threaded connector member toward the top side of the upper triple tree member.

11. The triple tree system for a motorcycle having two front fork tubes of claim 9, wherein each threaded connector member is externally threaded at both first and second ends, and each connection end of the handlebar members and each free end of the front fork tubes are internally threaded.

12. The triple tree system for a motorcycle having two front fork tubes of claim 10, further including at least one locking pin member protruding from the top side of the upper triple tree member adjacent each aperture therein, the at least one locking pin member insertable into an aperture in the connection end of the handlebar member, thereby locking an orientation of the handlebar member relative to the upper triple tree member.

13. The triple tree system for a motorcycle having two front fork tubes of claim 9, wherein each threaded connector member includes a feature at the second end thereof adapted for receiving a tool to rotate the threaded connector member.

14. The triple tree system for a motorcycle having two front fork tubes of claim 9, wherein the internally threaded apertures of the lower triple tree member intersect each fork tube aperture at a non-perpendicular angle.

15. The triple tree system for a motorcycle having two front fork tubes of claim 9, wherein the stem member includes threaded upper and lower ends, the threaded upper end attached to a threaded cavity in the upper triple tree member, and the threaded lower end attached to a mounting plug member secured in a plug aperture in the lower triple tree member.

16. The triple tree system for a motorcycle having two front fork tubes of claim 15, further including a second set screw member positioned within a threaded aperture intersecting the plug aperture in the lower triple tree member and an external surface thereof, the second set screw member advancing into the plug aperture, thereby contacting the mounting plug member therein.

17. A triple tree system for a motorcycle having two front fork tubes, each front fork tube having a fixed lower end and a free upper end, the triple tree system adapted for mounting to individual handlebar members and to a frame of the motorcycle, the triple tree system comprising:

an upper triple tree member and a lower triple tree member, the triple tree members positioned in register;

the upper triple tree member having a top side and a bottom side, the upper triple tree member including a pair of apertures each having a threaded connector member rotatably mounted therein, each threaded connector member secured at a first end to a connection end of one handlebar member, the connection end of each handlebar member contacting the top side of the upper triple tree member and engaging at least one locking pin member protruding from the top side of the upper triple tree member, a second end of each threaded connector member adapted for securing to a free upper end of one front fork tube of the motorcycle;

the lower triple tree member including a pair of fork tube apertures, each fork tube aperture adapted for receiving one of the front fork tubes of the motorcycle there through, a pair of internally threaded apertures, each internally threaded aperture intersecting an exterior surface of the lower triple tree member and one fork tube aperture adapted for holding a front fork tube, a set screw member within each internally threaded aperture for advancing a rod into one fork tube aperture, thereby contacting one of the front fork tubes therein, and locking the front fork tubes to the lower triple tree member; and a stem member attached between the upper and lower triple tree members, the stem member including threaded upper and lower ends, the threaded upper end attached to a threaded cavity in the upper triple tree member, and the threaded lower end attached to a mounting plug member secured in a plug aperture in the lower triple tree member, the stem member adapted for attachment to the frame of the motorcycle.

18. The triple tree system for a motorcycle having two front fork tubes of claim 17, wherein the apertures in the upper triple tree member each include a shoulder area limiting movement of the threaded connector member toward the top side of the upper triple tree member.

19. The triple tree system for a motorcycle having two front fork tubes of claim 17, wherein each threaded connector member includes a feature at the second end thereof adapted for receiving a tool to rotate the threaded connector member.

20. The triple tree system for a motorcycle having two front fork tubes of claim 17, further including a second set screw member positioned within a threaded aperture intersecting the plug aperture in the lower triple tree member and an external surface of the lower triple tree member, the second set screw member advancing into the plug aperture, thereby contacting the mounting plug member therein.

* * * * *